(12) United States Patent
Byun et al.

(10) Patent No.: US 11,306,005 B2
(45) Date of Patent: Apr. 19, 2022

(54) METHOD FOR PREPARING NICKEL OXIDE NANOPARTICLES AND NICKEL OXIDE NANOPARTICLES PRODUCED BY USING THE SAME

(71) Applicant: LG CHEM, LTD., Seoul (KR)

(72) Inventors: Won Bae Byun, Daejeon (KR); Eun Kyu Seong, Daejeon (KR); Myoung Hwan Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 241 days.

(21) Appl. No.: 16/627,201

(22) PCT Filed: Jun. 28, 2018

(86) PCT No.: PCT/KR2018/007361
§ 371 (c)(1),
(2) Date: Dec. 27, 2019

(87) PCT Pub. No.: WO2019/004755
PCT Pub. Date: Jan. 3, 2019

(65) Prior Publication Data
US 2020/0222979 A1    Jul. 16, 2020

(30) Foreign Application Priority Data
Jun. 30, 2017    (KR) .................. 10-2017-0083651

(51) Int. Cl.
*C01G 53/04* (2006.01)
*B22F 1/07* (2022.01)
*B22F 1/142* (2022.01)

(52) U.S. Cl.
CPC ................ *C01G 53/04* (2013.01); *B22F 1/07* (2022.01); *B22F 1/142* (2022.01); *B22F 2302/25* (2013.01); *B22F 2304/056* (2013.01); *C01P 2004/64* (2013.01); *C01P 2006/12* (2013.01)

(58) Field of Classification Search
CPC ............ C01G 53/04; B22F 1/142; B22F 1/07
See application file for complete search history.

(56) References Cited

U.S. PATENT DOCUMENTS

2009/0324486 A1    12/2009    Bahari Molla Mahaleh et al.

FOREIGN PATENT DOCUMENTS

| CN | 101555042 A | 10/2009 |
|---|---|---|
| CN | 102249348 A | 11/2011 |
| CN | 102992411 B | 12/2014 |
| JP | 2005-2395 A | 1/2005 |
| JP | 2013-40068 A | 2/2013 |
| KR | 10-2013-0122290 A | 11/2013 |
| KR | 10-1328154 B1 | 11/2013 |
| KR | 10-1593748 B1 | 2/2016 |
| WO | WO 2007/098111 A2 | 8/2007 |
| WO | WO 2007/098111 A3 | 8/2007 |

OTHER PUBLICATIONS

Extended Search Report for European Patent Application No. 16823232.6, dated Jun. 9, 2020.
(Continued)

*Primary Examiner* — James A Fiorito
(74) *Attorney, Agent, or Firm* — Birch, Stewart, Kolasch & Birch, LLP

(57) ABSTRACT

A method for producing nickel oxide nanoparticles and nickel oxide nanoparticles produced by using the same.

7 Claims, 7 Drawing Sheets

(56) References Cited

OTHER PUBLICATIONS

El-Kemary et al., "Nickel oxide nanoparticles: Synthesis and spectral studies of interact ions with glucose," Materials Science in Semiconductor Processing, vol. 16, Issue 6, 2013, pp. 1747-1752.
International Search Report (PCT/ISA/210) issued in PCT/KR2018/007361, dated Oct. 5, 2018.

[Figure 1]
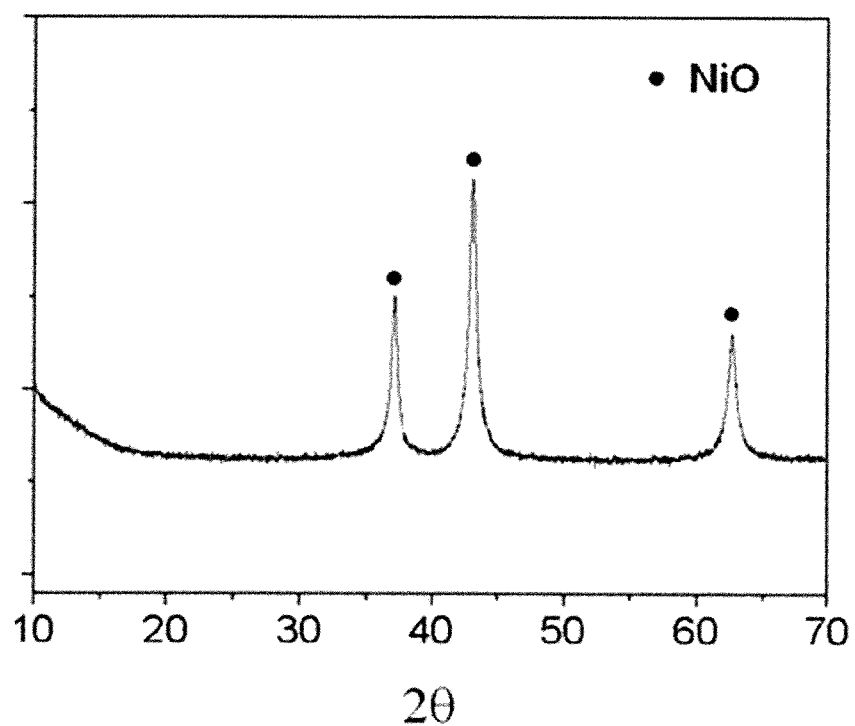

[Figure 2]
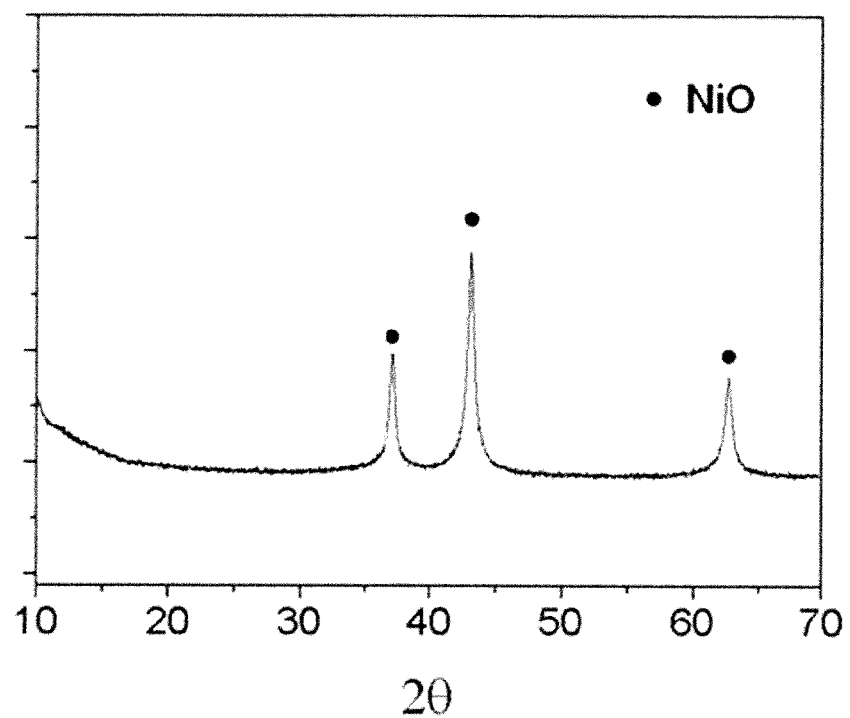

[Figure 3]
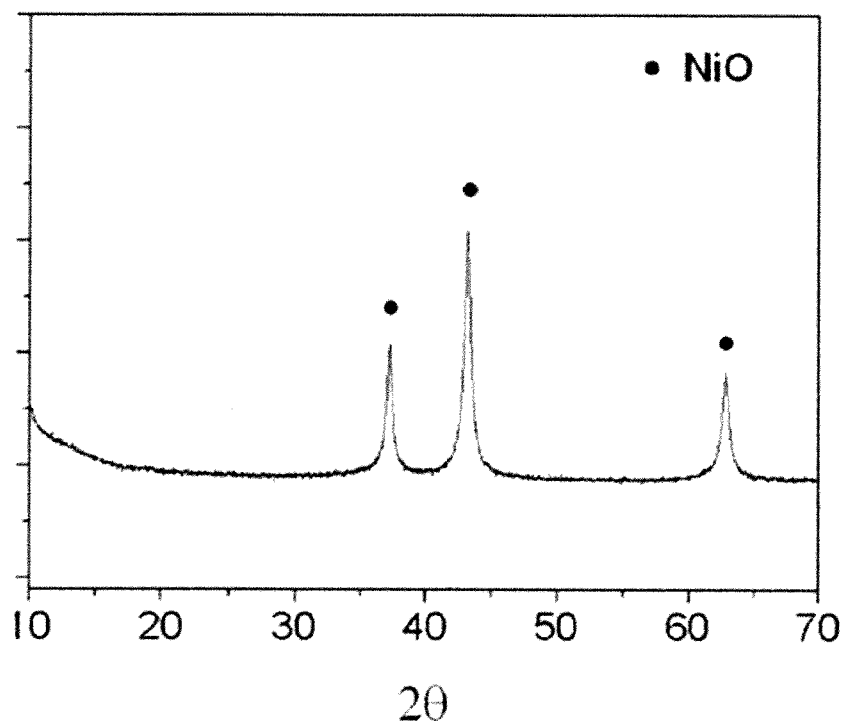
[Figure 4]
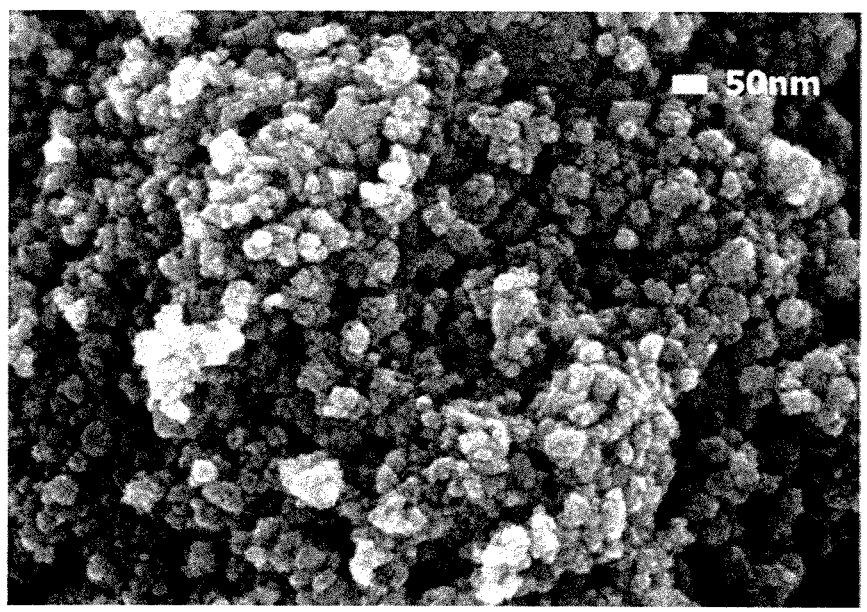

[Figure 5]
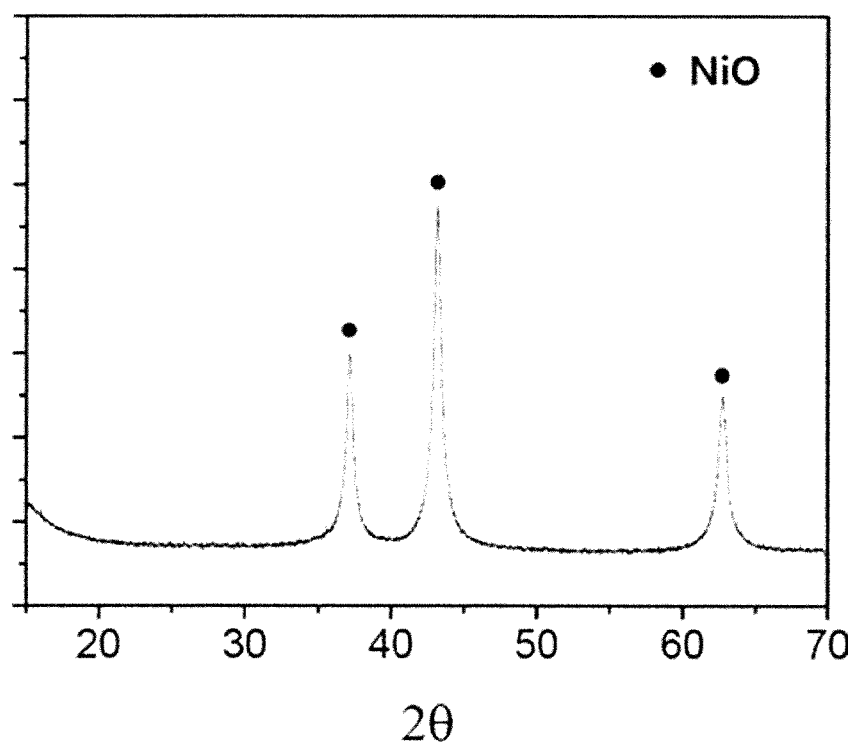

[Figure 6]
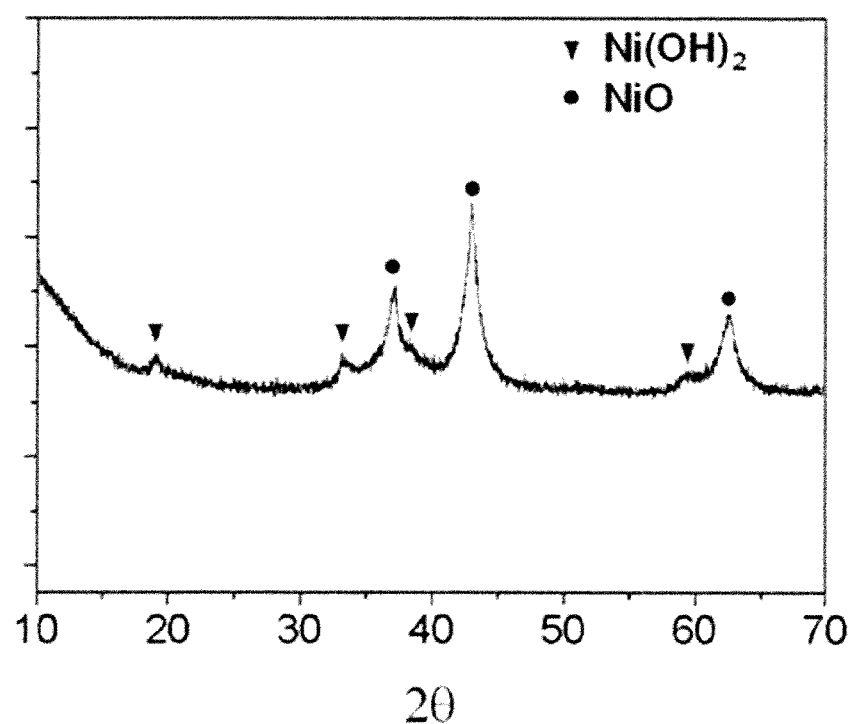

[Figure 7]
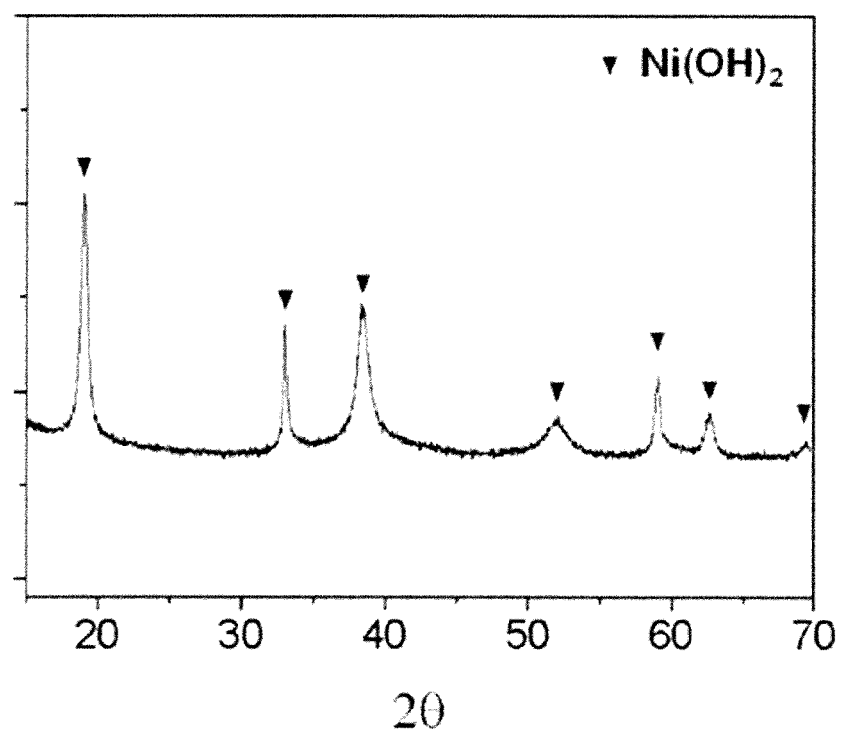

[Figure 8]
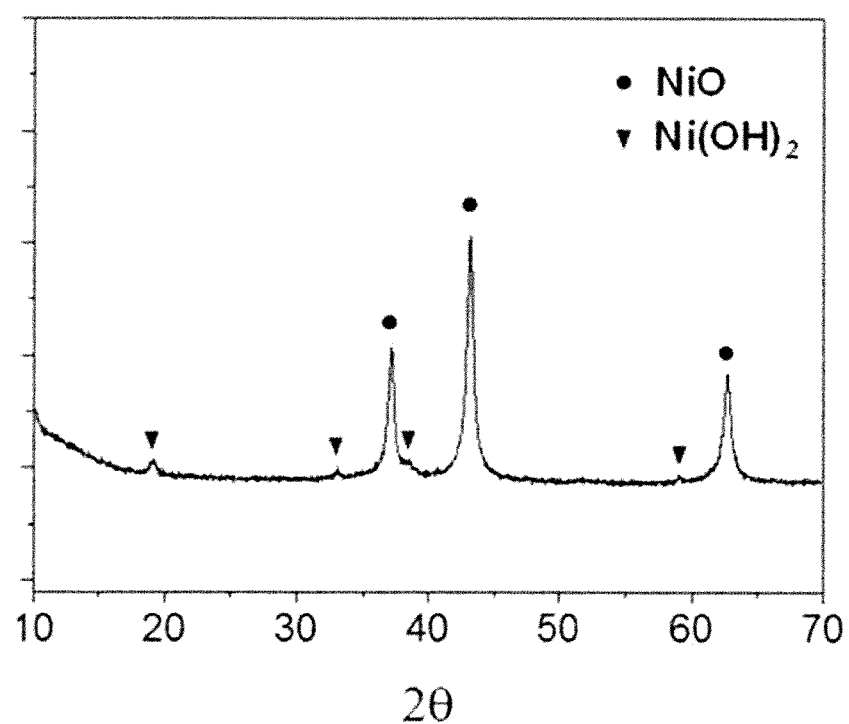

METHOD FOR PREPARING NICKEL OXIDE NANOPARTICLES AND NICKEL OXIDE NANOPARTICLES PRODUCED BY USING THE SAME

TECHNICAL FIELD

The present specification claims priority to and the benefit of Korean Patent Application No. 10-2017-0083651 filed in the Korean Intellectual Property Office on Jun. 30, 2017, the entire contents of which are incorporated herein by reference.

The present invention relates to a method for producing nickel oxide nanoparticles and nickel oxide nanoparticles produced by using the same.

BACKGROUND ART

Nickel oxide has nickel vacancies, and due to the vacancies, nickel oxide has p-type semiconductor characteristics (band gap of 3.6 eV to 4.0 eV, conduction band energy of 1.8 eV). In order to apply these characteristics, people have various interests in nickel oxide, and nickel oxide may be used in various ways such as a p-type transparent conducting film, a gas sensor, an electrochromic film, a magnetic material, a dye sensitive photodiode, a biosensor, and a battery positive electrode material. Furthermore, since nickel oxide has a quantum effect, a surface effect, and a volume effect, the importance of nickel oxide nanoparticles has been increasing as compared to nickel oxide microparticles.

In order to synthesize such nickel oxide, a method of allowing a metallic nickel powder to react with oxygen at a temperature of 400° C. or more, or a method of forming nickel oxide by thermally decomposing a nickel salt at a temperature of 500° C. or more may be generally used. However, when these methods are used, there is a problem in that the particle diameter and particle diameter distribution of nickel oxide are increased due to the high heat treatment temperature, and there is a problem in that the process costs increase. Further, there is a method of producing nickel oxide by using a sol-gel synthesis method in order to reduce high process costs, but since the method uses toxic organic solvents, there is a problem with the management and treatment of organic solvents, and furthermore, there is an environmental pollution problem due to organic solvents.

Therefore, there is a need for studies on a production method capable of reducing the process costs, reducing the burden of environmental pollution, and regulating the particle diameter of nickel oxide.

PRIOR ART DOCUMENT

Patent Document

U.S. Pat. No. 8,110,173 B2

DETAILED DESCRIPTION OF THE INVENTION

Technical Problem

The present invention provides a method for producing nickel oxide nanoparticles and nickel oxide nanoparticles produced by using the same.

However, a problem to be solved by the present invention is not limited to the aforementioned problem, and the other problems that are not mentioned may be clearly understood by a person skilled in the art from the following description.

Technical Solution

An exemplary embodiment of the present invention provides a method for producing nickel oxide nanoparticles, the method including: preparing $Ni(OH)_2$ powder and KOH powder; forming a mixed powder by mixing the $Ni(OH)_2$ powder with the KOH powder; and heat-treating the mixed powder at a temperature of 90° C. to 200° C.

Another exemplary embodiment of the present invention provides nickel oxide nanoparticles produced by the production method.

Advantageous Effects

A method for producing nickel oxide nanoparticles according to an exemplary embodiment of the present invention has an advantage in that the production costs can be significantly reduced because nickel oxide nanoparticles can be produced by a simple method.

The method for producing nickel oxide nanoparticles according to an exemplary embodiment of the present invention has advantages in that a high heat treatment temperature is not required and nickel oxide nanoparticles having a small particle diameter can be produced.

BRIEF DESCRIPTION OF DRAWINGS

FIG. 1 illustrates an X-ray diffraction (XRD) measurement result of nickel oxide nanoparticles produced in Example 1.

FIG. 2 illustrates an X-ray diffraction (XRD) measurement result of nickel oxide nanoparticles produced in Example 2.

FIG. 3 illustrates an X-ray diffraction (XRD) measurement result of nickel oxide nanoparticles produced in Example 3.

FIG. 4 illustrates a scanning electron microscope (SEM) image of the nickel oxide nanoparticles produced in Example 3.

FIG. 5 illustrates an X-ray diffraction (XRD) measurement result of nickel oxide nanoparticles produced in Example 4.

FIG. 6 illustrates an X-ray diffraction (XRD) measurement result of nickel oxide nanoparticles produced in Comparative Example 1.

FIG. 7 illustrates an X-ray diffraction (XRD) measurement result of nanoparticles synthesized in Comparative Example 2.

FIG. 8 illustrates an X-ray diffraction (XRD) measurement result of nickel oxide nanoparticles produced in Comparative Example 3.

BEST MODE

Throughout the specification of the present application, terms, such as a "step" or a "step of . . . ", do not mean a "step for . . . ".

When one part "includes" one constituent element throughout the present specification, unless otherwise specifically described, this does not mean that another constituent element is excluded, but means that another constituent element may be further included.

Hereinafter, the present specification will be described in more detail.

An exemplary embodiment of the present invention provides a method for producing nickel oxide nanoparticles, the method including: preparing $Ni(OH)_2$ powder and KOH powder; forming a mixed powder by mixing the $Ni(OH)_2$ powder with the KOH powder; and heat-treating the mixed powder at a temperature of 90° C. to 200° C.

According to an exemplary embodiment of the present invention, the heat-treating of the mixed powder may be performed at a temperature of 90° C. to 180° C., 90° C. to 160° C., 90° C. to 150° C., 90° C. to 140° C., 90° C. to 130° C., 90° C. to 120° C., 100° C. to 200° C., 100° C. to 180° C., 100° C. to 160° C., 100° C. to 150° C., 100° C. to 140° C., 100° C. to 130° C., or 100° C. to 120° C.

According to an exemplary embodiment of the present invention, since nickel oxide nanoparticles may be synthesized by performing a heat treatment at low temperature like the above-described range, there is an advantage in that the production processability of nickel oxide nanoparticles may be improved. Further, there is an advantage in that a diffusion phenomenon is suppressed by adjusting the heat treatment temperature to the above-described range, so that nickel oxide nanoparticles having smaller particle diameters may be synthesized.

According to an exemplary embodiment of the present invention, the $Ni(OH)_2$ powder and the KOH powder each are in the form of a solid-phase powder, and the method for producing nickel oxide nanoparticles uses a solid-phase synthesis method instead of a wet synthesis method. Further, the mixed powder may be a mixture of the $Ni(OH)_2$ powder and the KOH powder.

The method for producing nickel oxide nanoparticles according to an exemplary embodiment of the present invention uses a solid-phase synthesis method, and has an advantage in that a surfactant is not used at all during the production process.

When the wet synthesis method is used, there is a problem in that a very large reactor needs to be used for mass-producing nickel oxide nanoparticles. In addition, since the wet synthesis method uses an acid or base reaction, there are problems in that it is difficult to control reaction heat generated during the mass-production process, and a lot of time is required to complete the reaction. Furthermore, the wet synthesis method has a problem in that the production costs are increased because it is difficult to maintain and repair the equipment, the process of recovering the synthesized particles is complicated, and a large amount of wastewater may be generated in this process.

In contrast, the method for producing nickel oxide nanoparticles according to an exemplary embodiment of the present invention has an advantage in that nickel oxide nanoparticles can be stably mass-produced within a short period of time by using a solid-phase synthesis method. Furthermore, since the method for producing nickel oxide nanoparticles may simplify synthesis conditions, there is an advantage in that nickel oxide nanoparticles can be stably produced.

According to an exemplary embodiment of the present invention, a molar ratio of the $Ni(OH)_2$ powder to the KOH powder in the mixed powder may be 1:1.6 to 1:3. The molar ratio of the $Ni(OH)_2$ powder to the KOH powder in the mixed powder may mean a ratio of the number of moles of the $Ni(OH)_2$ powder to the number of moles of the KOH powder.

Specifically, according to an exemplary embodiment of the present invention, the molar ratio of the $Ni(OH)_2$ powder to the KOH powder in the mixed powder may be 1:1.6 to 1:2.5, 1:1.16 to 1:2, 1:1.8 to 1:3, 1:1.8 to 1:2.5, or 1:1.8 to 1:2.

When the molar ratio of the $Ni(OH)_2$ powder to the KOH powder in the mixed powder is within the above range, the produced nickel oxide nanoparticles may not include $Ni(OH)_2$ which is a residual hydroxide, and the like, and nickel oxide nanoparticles with high purity can be produced. Furthermore, it is possible to suppress the KOH residue from being present in an excessive amount in the prepared nickel oxide nanoparticles by adjusting the ratio of the KOH powder in the mixed powder to the above-described range, and accordingly, the process of removing the KOH residue may be simplified.

According to an exemplary embodiment of the present invention, a respective specific surface area of the $Ni(OH)_2$ powder and the KOH powder may be 0.01 $m^2/g$ to 200 $m^2/g$. Specifically, the specific surface area of the $Ni(OH)_2$ powder and the KOH powder may be each 0.01 $m^2/g$ to 150 $m^2/g$, 0.01 $m^2/g$ to 120 $m^2/g$, 0.01 $m^2/g$ to 100 $m^2/g$, 0.01 $m^2/g$ to 80 $m^2/g$, 0.01 $m^2/g$ to 60 $m^2/g$, 0.01 $m^2/g$ to 40 $m^2/g$, 0.1 $m^2/g$ to 150 $m^2/g$, 0.5 $m^2/g$ to 150 $m^2/g$, 1 $m^2/g$ to 150 $m^2/g$, 2 $m^2/g$ to 150 $m^2/g$, 5 $m^2/g$ to 150 $m^2/g$, or 10 $m^2/g$ to 150 $m^2/g$.

The method for producing the nickel oxide nanoparticles is performed by a solid-phase synthesis method, and the smaller the particle sizes of the $Ni(OH)_2$ powder and the KOH powder are, the more advantageous the $Ni(OH)_2$ powder and the KOH powder are, and when the $Ni(OH)_2$ powder and the KOH powder have a specific surface area within the above range, it is possible to obtain uniform nickel oxide nanoparticles having a small particle size more effectively.

According to an exemplary embodiment of the present invention, the heat-treating of the mixed powder may be carried out under an atmosphere of normal humidity and normal pressure. The atmosphere of normal humidity and normal pressure is an atmosphere of humidity and atmospheric pressure, which is not artificially manipulated, and may be, for example, an atmosphere of a humidity of 45% RH to 85% RH and an atmospheric pressure of 860 mbar to 1,060 mbar.

According to an exemplary embodiment of the present specification, the nickel oxide nanoparticles may have an average particle diameter of 5 nm to 50 nm. Specifically, the nickel oxide nanoparticles may have an average particle diameter of 5 nm to 50 nm, 5 nm to 40 nm, 5 nm to 30 nm, or 5 nm to 25 nm, 10 nm to 50 nm, 10 nm to 40 nm, 10 nm to 30 nm, 10 nm to 25 nm, or 15 nm to 25 nm.

The method for producing nickel oxide nanoparticles according to an exemplary embodiment of the present invention has an advantage in that it is possible to produce nickel oxide nanoparticles having a very small particle diameter within the aforementioned range. When an ink solution is produced and coated by using the particulate of the nickel oxide nanoparticles produced as described above, there is an advantage in that a thin film having very high density may be produced.

The particle diameter of the nickel oxide nanoparticles may be measured by a scanning electron microscope (SEM) image or a particle size analyzer (Malvern, Japan). Specifically, the particle diameter of the nickel oxide nanoparticles may be a particle diameter in which a secondary particle size is measured by dynamic light scattering on a nano-colloidal solution using a particle size analyzer.

According to an exemplary embodiment of the present specification, the nickel oxide nanoparticles may have a specific surface area of 100 m²/g or more. Specifically, the nickel oxide nanoparticles may have a specific surface area of 110 m²/g or more, or 120 m²/g or more. Further, the nickel oxide nanoparticles may have a specific surface area of 200 m²/g or less, 180 m²/g or less, or 150 m²/g or less. More specifically, the nickel oxide nanoparticles may have a specific surface area of 100 m²/g to 200 m²/g, 110 m²/g to 180 m²/g, 120 m²/g to 150 m²/g, 110 m²/g to 140 m²/g, or 150 m²/g to 190 m²/g.

The specific surface area in the present invention was measured by using the BET method, and specifically, the specific surface area may be measured by adding 0.3 g to 0.5 g of a sample to a tube, pre-treating the sample at 100° C. for 8 hours, and then using ASAP2020 (Micromeritics, USA) at room temperature. An average value may be obtained by measuring the same sample three times.

According to an exemplary embodiment of the present invention, a content of hydroxide in the nickel oxide nanoparticles may be less than 0.1 wt %. Specifically, according to an exemplary embodiment of the present invention, a content of hydroxide in the nickel oxide nanoparticles may be 0 wt %. The nickel oxide nanoparticles may include no hydroxide. Specifically, the nickel oxide nanoparticles produced by the production method according to an exemplary embodiment of the present invention may include no residual hydroxide such as $Ni(OH)_2$ and KOH. That is, the production method according to an exemplary embodiment of the present invention has an advantage in that nickel oxide nanoparticles with higher purity may be produced.

An exemplary embodiment of the present invention provides nickel oxide nanoparticles produced by the production method.

According to an exemplary embodiment of the present invention, the nickel oxide nanoparticles may be used for an electrochromic film, a material for a positive electrode of a secondary battery, and various catalysts or gas sensors.

Mode for Invention

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to a person with ordinary skill in the art.

Example 1

9.2 g (0.1 mol) of solid-phase $Ni(OH)_2$ powder (manufacturer: Sigma-Aldrich) and 11.2 g (0.2 mol) of a solid-phase KOH powder (manufacturer: Sigma-Aldrich) were prepared, and mixed while being ground by a mortar. In this case, a molar ratio of the $Ni(OH)_2$ powder:the KOH powder was 1:2.

After the mixed powder mixed as described above was put into an alumina crucible, a heat treatment was carried out at about 100° C. for about 15 hours, and after the heat treatment, a method of putting the solid content into distilled water and recovering the reactant by a centrifuge was performed repeatedly four times, and then nickel oxide nanoparticles were obtained by washing and drying the product.

FIG. 1 illustrates an X-ray diffraction (XRD) measurement result of the nickel oxide nanoparticles produced in Example 1. According to FIG. 1, it was confirmed that from the nickel oxide nanoparticles produced in Example 1, impurities other than nickel oxide were not detected.

Example 2

Nickel oxide nanoparticles were obtained in the same manner as in Example 1, except that during the heat treatment, the temperature and the heat treatment time were adjusted to about 120° C. and about 1 hour, respectively.

FIG. 2 illustrates an X-ray diffraction (XRD) measurement result of the nickel oxide nanoparticles produced in Example 2. According to FIG. 2, it was confirmed that from the nickel oxide nanoparticles produced in Example 2, impurities other than nickel oxide were not detected.

Example 3

Nickel oxide nanoparticles were obtained in the same manner as in Example 1, except that during the heat treatment, the temperature and the heat treatment time were adjusted to about 110° C. and about 1 hour, respectively, and the molar ratio of the $Ni(OH)_2$ powder:the KOH powder was adjusted to 1:1.8.

FIG. 3 illustrates an X-ray diffraction (XRD) measurement result of the nickel oxide nanoparticles produced in Example 3. According to FIG. 3, it was confirmed that from the nickel oxide nanoparticles produced in Example 3, impurities other than nickel oxide were not detected.

FIG. 4 illustrates a scanning electron microscope (SEM) image of the nickel oxide nanoparticles produced in Example 3. According to FIG. 4, it was confirmed that the average particle diameter of the nickel oxide nanoparticles produced in Example 3 was about 20 nm.

Example 4

Solution A in which 29.1 g of $Ni(NO_3)_2 \cdot 6H_2O$ was dissolved in 100 ml of water was prepared, Solution B in which 8 g of NaOH was dissolved in 100 ml of water was prepared, and then Solution A and Solution B were mixed. $Ni(OH)_2$ powder was obtained by recovering precipitating particles from the mixed solution by a centrifuge, and washing and drying the particles.

Nickel oxide nanoparticles were obtained in the same manner as in Example 1, except that the $Ni(OH)_2$ powder produced as described above was used.

FIG. 5 illustrates an X-ray diffraction (XRD) measurement result of the nickel oxide nanoparticles produced in Example 4. According to FIG. 5, it was confirmed that from the nickel oxide nanoparticles produced in Example 4, impurities other than nickel oxide were not detected.

Comparative Example 1

Nickel oxide nanoparticles were obtained in the same manner as in Example 1, except that during the heat treatment, the temperature and the heat treatment time were adjusted to about 80° C. and about 20 hours, respectively. FIG. 6 illustrates an X-ray diffraction (XRD) measurement result of the nickel oxide nanoparticles produced in Comparative Example 1. According to FIG. 6, it was confirmed that unlike Examples 1 to 4, impurities were included because hydroxide $Ni(OH)_2$, in addition to nickel oxide, was detected from the nickel oxide nanoparticles produced in Comparative Example 1.

Comparative Example 2

Nanoparticles synthesized in the same manner as in Example 1 were obtained, except that 8 g (0.2 mol) of NaOH was used instead of 11.2 g (0.2 mol) of KOH.

FIG. 7 illustrates an X-ray diffraction (XRD) measurement result of the nanoparticles synthesized in Comparative Example 2. According to FIG. 7, it was confirmed that when nanoparticles were synthesized by the method in Comparative Example 2, the reaction did not occur, and as a result, nickel oxide nanoparticles were not formed and $Ni(OH)_2$ in the initial state remained as it is.

Comparative Example 3

Nickel oxide nanoparticles were obtained in the same manner as in Example 1, except that during the heat treatment, the temperature and the heat treatment time were adjusted to about 110° C. and about 1 hour, respectively, and the molar ratio of the $Ni(OH)_2$ powder:the KOH powder was adjusted to 1:1.5.

FIG. 8 illustrates an X-ray diffraction (XRD) measurement result of the nickel oxide nanoparticles produced in Comparative Example 3. According to FIG. 8, it was confirmed that unlike the Examples, impurities were included because hydroxide $Ni(OH)_2$, in addition to nickel oxide, was detected from the nickel oxide nanoparticles produced in Comparative Example 3.

Therefore, it can be seen that the method for producing nickel oxide nanoparticles according to an exemplary embodiment of the present invention can easily produce nickel oxide nanoparticles having high purity by adjusting the molar ratio of the $Ni(OH)_2$ powder to the KOH powder and adjusting the heat treatment temperature of the mixed powder.

The invention claimed is:

1. A method for producing nickel oxide nanoparticles, the method comprising:
   preparing a $Ni(OH)_2$ powder and a KOH powder;
   forming a mixed powder by mixing the $Ni(OH)_2$ powder with the KOH powder; and
   heat-treating the mixed powder at a temperature of 90° C. to 200° C.

2. The method of claim 1, wherein a molar ratio of the $Ni(OH)_2$ powder to the KOH powder in the mixed powder is 1:1.6 to 1:3.

3. The method of claim 1, wherein a specific surface area of the $Ni(OH)_2$ powder is 0.01 $m^2/g$ to 200 $m^2/g$ and a specific surface area of the KOH powder is 0.01 $m^2/g$ to 200 $m^2/g$.

4. The method of claim 1, wherein the heat-treating of the mixed powder is carried out under an atmosphere of normal humidity and normal pressure.

5. The method of claim 1, wherein the nickel oxide nanoparticles have an average particle diameter of 5 nm to 50 nm.

6. The method of claim 1, wherein the nickel oxide nanoparticles have a specific surface area of 100 $m^2/g$ or more.

7. The method of claim 1, wherein a content of hydroxide in the nickel oxide nanoparticles is less than 0.1 wt %.

* * * * *